United States Patent [19]

Milligan

[11] 3,878,300

[45] Apr. 15, 1975

[54] TREATMENT OF FERMENTED BEVERAGES TO INCREASE CHILL HAZE STABILITY

[75] Inventor: Daniel J. Milligan, Houston, Tex.

[73] Assignee: N. L. Industries, Inc., New York, N.Y.

[22] Filed: Apr. 3, 1974

[21] Appl. No.: 457,420

Related U.S. Application Data

[63] Continuation-in-part of Ser. No. 310,804, Nov. 30, 1972, abandoned.

[52] U.S. Cl. .................... 426/16; 426/11; 426/271; 426/330; 426/422
[51] Int. Cl............................................... C12h 1/04
[58] Field of Search ............ 426/330, 422, 291, 11, 426/16; 252/313

[56] References Cited
UNITED STATES PATENTS

| | | | |
|---|---|---|---|
| 2,588,389 | 3/1952 | Iler...................................... | 252/313 |
| 3,617,301 | 11/1971 | Barby et al. ......................... | 426/330 |

*Primary Examiner*—David M. Naff
*Attorney, Agent, or Firm*—Roy F. House; Delmar H. Larsen; Fred Floersheimer

[57] ABSTRACT

A novel process of removing chill haze precursor substances from fermented beverages, particularly beer, in order to increase the chill haze stability of such beverages which is characterized by adding to the beverage before final filtration from 50 to 500 p.p.m. of a polysilicic acid coagulant in the form of a polysilicic acid hydrosol obtained by aging a silicic acid hydrosol prepared by ion-exchange for a period of time which is at least equal to 15% of the gelation time of the hydrosol, aging the treated beverage for a period of time sufficient to coagulate chill haze precursor substances in the beverage, and removing the polysilicic acid from the beer.

15 Claims, No Drawings

TREATMENT OF FERMENTED BEVERAGES TO INCREASE CHILL HAZE STABILITY

This application is a continuation-in-part of my copending application Ser. No. 310,804, filed Nov. 30, 1972, now abandoned.

BACKGROUND OF THE INVENTION

This invention relates to a process for producing beer and other fermented beverages having improved appearance and chill haze stability. In particular, the invention relates to a method of removing substances from a fermented beverage which produce haze upon chilling the beverage.

PRIOR ART

It is known that fermented beverages such as beer and wine contain precipitated proteins or protein-polyphenol (protein-tannin) complexes after they have been bottled and stored for some time. In particular, fermented beverages contain proteins and protein-polyphenol complexes which may be soluble at room temperature but which precipitate forming a haze upon chilling of the beverage. This haze, the so-called chill haze, is very undesireable in that the beverage then appears spoiled to the customer and its taste may be affected.

Many attempts have been made to prevent fermented beverages from developing this chill haze, or at least to prolong its development such that the beverage will be consumed before it becomes apparent. Thus the prior art has suggested the addition of proteolytic enzymes to beer to aid in breaking down the high molecular weight proteins and thus chillproof the beer. While the use of such enzymes, particularly papain, is widespread in the United States, their use is expensive and is moreover not allowed in those countries which prevent the addition to beer of any material which remains in the beer. Many breweries precipitate proteins during lagering (ruh storage) through the addition of tannic acid. Various attempts have been made to use adsorbents to remove proteins, polyphenols, or other protein-polyphenol complexes from beer in order to prevent the chill haze from forming. Silica gel, polyvinylpyrrolidone, nylon, charcoal, various polymers and clays such as bentonite and hectorite have been used and they have met with some commercial success. Nevertheless, there still remains a need for a more dependable method for the retardation or prevention of chill haze development since each of these treatments has various characteristics which limit its usefulness.

Many adsorbents based on silica have been proposed for use in enhancing the colloidal stability of fermented beverages. Thus, U.S. Pat. No. 2,316,241 discloses the use of an alkalized silica gel. U.S. Pat. No. 3,163,538 discloses a silica zerogel having certain specific characteristics whereas U.S. Pat. No. 3,436,225 discloses the use of this silica gel in conjunction with montmorillonite clay. An article by the patentee of the latter two patents appears in the MBAA Technical Quarterly, Vol. 1, No. 4, 203–211 (1964). U.S. Pat. No. 3,617,301 discloses the treatment of beer with a silica hydrogel having certain specific characteristics. U.S. Pat. No. 3,554,759 discloses the treatment of beer with a finely divided silica modified by a vinyl-pyrrolidone polymer. U.S. Pat. No. 3,512,987 discloses the use of a porous glass containing 96% silica. U.S. Pat. No. 3,413,120 discloses the use of a calcium silicate containing 0.1 to 5% calcium. German Pat. Nos. 485,771 and 682,788, Austrian Pat. No. 249,611 and Belgium Pat. No. 693,928 all disclose the use of various clay-silica combinations for beer treatment. Two references pertaining to the fining of beer with isinglass and silicic acid preparations are as follows: "Malting and Brewing Science," J. S. Hough, D. E. Briggs and R. Stevens, Chapman and Hall, Ltd., 1971, pp. 542–545; "Finings and Auxiliary Finings," J. T. Rowsell, Brewers' Guild Journal, Vol. 52, pp. 278–292, 1966.

It is known in the brewing art that silicic acid added to beer in the form of sodium silicate promotes colloidal instability in beer, and that silicic acid is a component of haze substances. The presence of silica in excessive quantities in beer has been reported to hasten the development of turbidities, while the addition of up to about 200 p.p.m. silica in the form of sodium silicate to finished beer causes no significant acceleration in the rate of haze development. See for example the following articles: (a) Netscher, H., Wochschr. Brau 45,582 (1928); 46,335 (1929); (b) Luers, H., Wochschr. Brau. 39,297 (1922); (c) Raux, J., Brasserie et Malterie 22,117 (1932); (d) Petit, P., Brasserie et Malterie 19,353 (1930); (e) Hartung, B. D., Wochschr. Brau. 54,321 (1937); (f) Stone, I. and Gray, P. P., Am. Soc. Brewing Chemists, Proc. 1948, 76; (g) Cuzner, J., Am. Soc. Brewing Chemists, Proc. 1969, 190–195; (h) Gramshaw, J. W., MBAA Technical Quaterly, 1970, 174. The addition of silicic acid obtained from the neutralization of sodium silicate with either hydrochloric acid or sulfuric acid to the mash-liquor used in brewing beer was studied by G. Bosewitz as reported in Nahrung, Vol. 3, 670–93 (1959). The experimental worts so treated were so obviously obnoxious in the early stages of the brewing process that the investigation was not carried to completion.

Silicic acid can be prepared from aqueous silicate solutions in many ways. An aqueous sodium silicate solution having silica: sodium oxide mole ratios from 0.5 to about 4.0 may be reacted with an acid to obtain an aqueous solution of silicic acid and the sodium salt of the reacting acid. Thus the reaction of a sodium silicate with a $SiO_2:Na_2O$ mole ratio of 0.5 with sulfuric acid can be represented as:

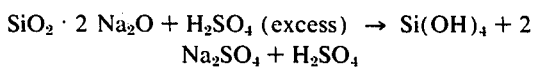

Generally when the alkali metal silicate has a silica to alkali metal oxide mole ratio greater than 0.5 the silicic acid formed is not the monomer, $Si(OH)_4$, but a molecule containing perhaps 3 – 4 silicon atoms. Alternatively silicic acid can be prepared by ion-exchanging an aqueous alkali metal silicate solution with a cation-exchange resin in the hydrogen form. In either case the silicic acid so formed is unstable and commences to polymerize as soon as it is formed by splitting off water, viz:

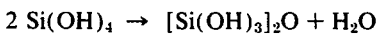

As the polymerization continues the overall reaction may be represented by:

$$X\ Si(OH)_4 \rightarrow X\ SiO_{n/2}(OH)_{4-n} + X\ (n/2)\ H_2O$$

where $X$ represents the number of silicic acid molecules which polymerize to form an individual polysilicic acid particle and $n$ represents the average number of hydroxyl groups in the silicic acid molecules which have undergone the condensation polymerization.

The rate of polymerization increases as the concentration of silicic acid in the aqueous silicic acid solution increases, as the temperature increases, and as the pH increases to about 5–8 in which pH range the polymerization is very rapid. As the polymerization of the polysilicic acid increases the viscosity and turbidity of the polysilicic acid hydrosol, sometimes referred to as a silica hydrosol, increases to such an extent that the polysilicic acid forms a gelatinous semi-solid gel. This is commonly referred to and herein called a silica hydrogel, and the time required to form the hydrogel is called the gelation time of the hydrosol. This hdyrogel can continue to polymerize by cross-linking of the polysilicic acid particles and as it does so synersis occurs and free water separates from the hydrogel. When water is removed from the hydrogel such as by drying a product known as a silica zerogel or silica gel is formed.

The polymerization of the polysilicic acid can be stopped and the polysilicic acid hydrosol stabilized by the addition of controlled amounts of sodium hydroxide or certain other basic materials as is well known in the silica art. Such stabilized polysilicic acid hydrosols may than be concentrated to increase the silica content and the particle size of the silica particles in the stabilized sol may be increased, all by processes well known in the silica art. E. I. du Pont de Nemours and Co. (Inc.) markets a series of stabilized polysilicic acid hydrosols of varying particle size and silica concentration under the trademark LUDOX.

SUMMARY OF THE INVENTION

I have now discovered that the addition to a fermented beverage such as beer or wine before final filtration of a polysilicic acid coagulant in the form of a polysilicic acid hydrosol prevents or retards the development of chill haze in the fermented beverage upon prolonged bottled storage.

Accordingly, it is an object of this invention to provide a process of increasing the chill haze stability of fermented beverages, particularly beer, which comprises adding to the beverage before final filtration from 50 to 500 parts per million parts of the beverage, by weight, of a polysilicic acid coagulant in the form of a polysilicic acid hydrosol, wherein the polysilicic acid hydrosol is obtained by forming a silicic acid hydrosol and aging the silicic acid hydrosol for a period of time which is equal to at least 15% of the gelation time of the hydrosol, and wherein the silicic acid hydrosol is formed by placing an aqueous solution of sodium silicate into intimate contact with a cation exchange resin in its hydrogen form whereby sodium ions in the silicate solution are removed by the resin and replaced with hydrogen ions from the resin, aging the polysilicic acid treated beverage for a period of time sufficient to coagulate chill haze precursor substances in the beverage, and separating the polysilicic acid from the beverage. Other objects and embodiments of this invention will become apparent in the following detailed specification.

DESCRIPTION OF THE PREFERRED EMBODIMENTS

The polysilicic acid coagulant useful in accordance with this invention for the removal of chill haze producing substances in fermented beverages, particularly beer, is prepared by polymerizing silicic acid in an aqueous solution. The silicic acid is obtained by an ion-exchange process wherein an aqueous alkali metal silicate solution, preferably sodium silicate, is placed in intimate contact with a cation-exchange resin in its hydrogen form whereby the sodium ions in the silicate solution are removed by the resin and replaced with hydrogen ions from the resin. Representative processes are disclosed in U.S. Pat. No. 2,588,389 and U.S. Pat. No. 2,726,216, both or which are incorporated herein by reference. Particularly preferred is the process disclosed in U.S. Pat. No. 3,649,556, also incorporated herein by reference. The silicic acid solution or hydrosol obtained has a pH within the range from 2.0 to 4.0, preferably 2.0 to 3.0, still more preferably 2.5 to 3.0, and has a silicic acid concentration from 1% to 9% calculated as weight percent silica, preferably 3% to 7%.

The alkali metal silicate used to prepare the silicic acid should have a silica:alkali metal oxide ratio from 1:1 to about 4:1, preferably from 2:1 to 4:1.

The silicic acid hydrosol so obtained by ion-exchange commences to polymerize immediately forming a polysilicic acid hydrosol. The polysilicic acid initially formed is of low molecular weight and is not effective in coagulating chill haze precursor substances in the beverage as is polysilicic acid having a higher molecular weight as the data given in the examples hereinafter will indicate. Accordingly the polysilicic acid hydrosol must be aged to increase the degree of polymerization of the polysilicic acid.

In accordance with this invention the polysilicic acid hydrosol must be aged for a period of time which is equal to at least 15% of its gelation time in order to effectively chillproof a fermented beverage. However, the hydrosol must not be aged to the extent that gelation occurs, thus producing a polysilicic acid hydrogel. Thus the maximum aging period of the hydrosol is less than 100% of the gelation time of the hydrosol.

The polymerization rate of the polysilicic acid increases with an increase in temperature, an increase in the silica concentration, and an increase in pH. Increasing one or more of these variables will increase the rate of polymerization and will serve to decrease the aging time in order to achieve any particular degree of polymerization. The pH should not be increased above about 5 because of the very rapid polymerization rate above this pH. Conversely, if so desired, decreasing one or more of these variables will decrease the polymerization rate and increase the aging time necessary to achieve any particular degree of polymerization. For instance, a properly aged and effective polysilicic acid hydrosol can be stored at a temperature above but near freezing such as at 30°F for extended periods of time during which the polymerization proceeds to gelation very slowly and during which the polysilicic acid hydrosol is very effective in retarding or preventing chill haze development in fermented beverages.

The data in the following table were obtained from a polysilicic acid hydrosol prepared by the ion-exchange process of U.S. Pat. No. 3,649,556 containing 5% polysilicic acid. The pH of the hydrosol was adjusted immediately after its preparation with either sodium hydroxide or sulfuric acid, as required, to give the indicated pH. The hydrosols were placed in constant temperature baths at the indicated temperature and the viscosity of each hydrosol was determined as a function of time. The data in the table is the number of hours the sol was aged until it reached a viscosity of 100 centipoise as measured in a 25°C water jacketed Brookfield RVT microviscometer at 20 RPM. This was abritrarily taken as the gelation point inasmuch as the viscosity increases rapidly as the hydrosol approaches the gelled semi-solid hydrogel state.

Experimental Gelation Times for 5% Polysilicic Acid Hydrosol

| Original pH at 20°C | Hours at Indicated Temperature | | | |
|---|---|---|---|---|
| | 0°C | 15°C | 30°C | 45°C |
| 1.5 | 1536 | 400 | 115 | 34 |
| 2.0 | 1440 | 288 | 76 | 24.5 |
| 2.5 | 720 | 195 | 62 | 21 |
| 3.0 | 624 | 150 | 46 | 14 |
| 3.5 | 336 | 74 | 23 | 5.75 |
| 4.0 | 140 | 28.5 | 7.8 | 2.5 |

The amount of polysilicic acid which must be added to the beverage in order to enhance the chill haze stability of the beverage is at least 50 p.p.m. (parts per million parts of the beverage, by weight). The maximum amount of polysilicic acid added to the beverage should be no greater than 500 p.p.m., preferably not greater than 250 p.p.m., since excessive quantities of polysilicic acid produce no increase in the chill haze stability of the beverage and produce an excessive amount of sludge in the treated beverage. The sludge filters poorly and is usually discarded thus wasting the beer associated therewith.

The polysilicic acid hydrosol must be added during the preparation of the fermented beverage before final filtration of that beverage since the polysilicic acid and the coagulated chill haze precursor substances must be removed from the beverage, preferably by filtration, or by sedimentation followed by filtration of the supernatent beverage.

The polysilicic acid hydrosol may be added before or after fermentation. Preferably the polysilicic acid hydrosol is added to the beverage after fermentation, more preferably as the beverage is being transferred to primary (ruh) storage from the fermentor. This may conveniently be done by means of a proportioning device which delivers measured quantities of the polysilicic acid hydrosol to the beverage.

The addition of the polysilicic acid hydrosol to wort after mashing and before addition of the hops would result in the removal of chill haze precursor substances obtained from the malt and grains and help facilitate the removal of the spent grains in the lauter tub or mash filter. The addition of the polysilicic acid hydrosol to wort after mashing and after boiling with the hops would also result in the removal of chill haze precursor substances obtained from the hops and facilitate the removal of the sludge during cooling of the wort.

After addition of the polysilicic acid to the beverage the beverage must be aged for a period of time sufficient to allow the polysilicic acid and chill haze precursor substances in the beer to coagulate. During this aging period the coagulant is simultaneously conditioned for easy removal from the beverage such as by filtration or sedimentation followed by centrifugation and/or filtration.

After primary storage the beverage is filtered and placed in a finishing tank. It may be desireable to add an enzyme such as papain to the treated and filtered beverage to further increase the chill haze stability of the beverage. In this case much less enzyme is needed than would be needed in the absence of the prior treatment of the beverage with the polysilicic acid.

The following examples will serve to illustrate the invention but are not to be construed as limiting the same except as discussed hereinafter.

EXAMPLE 1

The beer employed in this example was obtained immediately prior to ruh storage from a commercial brewery and transferred to a pilot brewery. There it was bottled in 12 oz. clear bottles crowned with perforated caps and rubber stoppers to allow for syringe injection of desired materials. A silicic acid hydrosol was prepared by the process disclosed in U.S. Pat. No. 3,649,556. The hydrosol contained 5% by weight silicic acid, calculated as silica, and had a pH of 2.9. To duplicate bottles of this fermented beer was added 100 p.p.m. (parts per million parts of beer, by weight, calculated as silica), approximately 10 grams per hectolitre of beer, of polysilicic acid obtained by aging the silicic acid hydrosol at room temperature for the number of hours indicated in Table 1. Between 48 and 72 hours aging the polysilicic acid hydrosol polymerized to form a hydrogel. This hydrogel was evaluated at 100 p.p.m. and at 400 p.p.m. polysilicic acid, calculated as silica. After one week of storage at a temperature between 30°–32°F, during which time the polysilicic acid and coagulated haze precursor substances settled as a sludge to the bottom of the bottles, the treated beer samples were filtered through ultrafilters containing 1.2$\mu$ pores (MILLIPORE filters), re-bottled with standard caps and placed in a cooler at 30°–32°F. The chill haze stability was determined with a commercial nephelometer (HAZE METER, Type UKM 1b, Manufactured by Radiometer of Copenhagen), expressed as A.S.B.C. Formazin Turbidity Units, after the beer samples were stored for 24 hours and 168 hours. The data obtained are given in Table 1.

This data indicates that the polysilicic acid aged five hours was completely ineffective at this concentration to stabilize the beer whereas the polysilicic acid aged for 24 and 48 hours produced a beer having excellent chill haze stability. The data also indicate that the gelatinous hydrogel was ineffective in stabilizing the beer and accordingly forms no part of the invention herein described and claimed.

Table 1

| Age of PSA[1] Hours | p.p.m. SiO$_2$ Added to Beer | Chill Haze[2] Formazin Turbidity Units | |
|---|---|---|---|
| | | 24 Hours | 168 Hours |
| 0 | 0 | 650+ | 650+ |
| 5 | 100 | 650+ | 650+ |
| 24 | 100 | 83 | 82 |
| 48 | 100 | 50 | 53 |
| 72 | 100 | 310 | 320 |
| 96 | 100 | 350 | 370 |
| 72 | 400 | 135 | 160 |
| 96 | 400 | 106 | 133 |

[1]PSA = polysilicic acid
[2]Average of two determinations

EXAMPLE 2

The beer employed in this example was obtained from a commercial brewery immediately prior to ruh storage, transferred to a pilot brewery, and bottled as in Example 1. Duplicate bottles of this fermented beer were treated with various concentrations of polysilicic acid hydrosol as indicated in Table 2 and evaluated as in Example 1. In addition, the turbidity of the beer as measured by the commercial nephelometer in Formazin Turbidity Units was measured after the week of storage before filtration in order to ascertain the ability of the polysilicic acid hydrosol to "fine" or clarify the beer. The data obtained are given in Table 2. The silicic acid was again prepared by the process of U.S. Pat. No. 3,649,556. The silicic acid hydrosol initially contained approximately 6% by weight silica and had a pH of 2.9. This hydrosol was split into several samples which were then diluted with deionized water to the concentrations given in Table 2 and aged at room temperature for the number of hours indicated to form the polysilicic acid. In order to increase the rate of polymerization of the polysilicic acid the pH of two hydrosol samples was increased to 4.0 with sodium hydroxide.

The data obtained indicate that the polysilicic acid fined the beer somewhat when using larger concentrations, and that the effectiveness of the polysilicic acid in coagulating the chill haze precursor substances in the beer, thus increasing the chill haze stability of the beer, can be altered by changing the degree of polymerization of the polysilicic acid by aging the hydrosol, by changing the pH of the hydrosol, or changing the concentration of the polysilicic acid in the hydrosol. The data also indicate that from 50 p.p.m. to 500 p.p.m. polysilicic acid enhanced the chill haze stability of the beverage. More polysilicic acid could be used but would be wasteful. Preferably 150 p.p.m. to 300 p.p.m. polysilicic acid should be added to the beverage.

Table 2

| Polysilicic Acid Hydrosol | | | p.p.m. SiO$_2$ Added to Beer | Formazin Turbidity Units[2] | | |
|---|---|---|---|---|---|---|
| PSA,[1] Hours | Age of % SiO$_2$ | pH | | Fining 168 Hours | Chill Haze 24 Hours | 168 Hours |
| — | — | — | 0 | 650+ | 418 | 470 |
| 48 | 5 | 2.9 | 10 | 650+ | 650+ | 650+ |
| 48 | 5 | 2.9 | 50 | 650+ | 208 | 270 |
| 48 | 5 | 2.9 | 100 | 650+ | 123 | 237 |
| 48 | 5 | 2.9 | 150 | 546 | 81 | 143 |
| 48 | 5 | 2.9 | 200 | 250 | 53 | 125 |
| 48 | 5 | 2.9 | 300 | 334 | 44 | 80 |
| 48 | 5 | 2.9 | 500 | 210 | 46 | 78 |
| 24 | 5 | 2.9 | 200 | 463 | 46 | 67 |
| 24 | 3 | 2.9 | 200 | 392 | 54 | 71 |
| 48 | 3 | 2.9 | 200 | 507 | 90 | 100 |
| 2 | 5 | 4.0 | 200 | 329 | 75 | 95 |
| 2 | 3 | 4.0 | 200 | 526 | 61 | 94 |
| 4 | 3 | 4.0 | 200 | 395 | 59 | 100 |

[1]PSA = polysilicic acid
[2]Average of two determinations

EXAMPLE 3

The beer employed in this example was obtained from a commercial brewery immediately prior to ruh storage, transferred to a pilot brewery, and bottled as in Example 1. Duplicate bottles of this fermented beer were treated with 500 p.p.m. of polysilicic acid. The polysilicic acid was prepared by aging for 40 hours a silicic acid hydrosol prepared as claimed in U.S. Pat. No. 3,649,556. The hydrosol contained 5% polysilicic acid and had a pH of 2.7. The turbidity of the treated bottles of beer was measured with the commercial nephelometer every 24 hours for a total of one week storage in order to obtain an indication of the ability of the polysilicic acid to fine the beer. Thereafter the bottles of beer were filtered through 1.2μ MILLIPORE filters, rebottled and placed in a refrigerator at 30°–32°F. The chill haze was then measured on the bottles of beer after 24 hours and 168 hours. The data obtained are given in Table 3.

The data indicate that the polysilicic acid was an excellent chillproofing additive for this beer and that it effectively fined the beer during one week of ruh storage.

Table 3

| Fining* Formazin Turbidity Units | | | | | | Chill Haze* Formazin Turbidity Units | |
|---|---|---|---|---|---|---|---|
| 24 Hours | 48 Hours | 96 Hours | 120 Hours | 144 Hours | 168 Hours | 24 Hours | 168 Hours |
| 142 (650+) | 118 (650+) | 121 (650+) | 105 (650+) | 101 (650+) | 89 (650+) | 39 (443) | 39 (453) |

*Values in parentheses were determined on the untreated ruh beer.

EXAMPLE 4

The beer employed in this example was obtained from a commercial brewery immediately prior to ruh storage and transferred to a pilot brewery. 25 liters of beer were treated with 200 p.p.m. of polysilicic acid and another 25 liters of beer were treated with 200 p.p.m. of TANSUL-7, a commercial grade of hectorite used as a chillproofing additive for beer. The TANSUL-7 was added in the form of a 2% by weight aqueous slurry. The polysilicic acid was added in the form of a polysilicic acid hydrosol containing 5% polysilicic acid, calculated as $SiO_2$, and having a pH of 2.8, which was obtained by aging for 24 hours a silicic acid hydrosol obtained by the process claimed in U.S. Pat. No. 3,649,556. The treated beers remained in ruh storage one week and were then prefiltered through diatomaceous earth. The samples were stored 48 more /hours, then polish filtered through 1,000 p.p.m. diatomaceous earth, carbonated to 2.85 vol $CO_2$, bottled, and pasteurized. A temperature of 34°F was maintained in the pilot brewery throughout the experiment.

The finished beers were immediately subjected to forcing tests and the chill haze stability determined with the commercial nephelometer, the turbidities being expressed as A.S.B.C. Formazin Turbidity Units. The forcing tests consisted of: (1) chilling for 48 hours at 30°F; (2) agitation by rotating the bottles at 11 rpm for 6 hours followed by 24 hours chilling at 30°F; and (3) incubation at 120°F for 48 hours followed by 24 hours chilling at 30°F. These beer forcing tests were also conducted on the finished beers after they had been stored at room temperature for 45 days. The data obtained are given in Table 4.

ferred to a pilot brewery, and bottled as in Example 1. Duplicate bottles of this fermented beer were treated with various concentrations of polysilicic acid. The polysilicic acid was prepared by aging for 2 hours at 45°C a silicic acid hydrosol containing 5% polysilicic acid, prepared as disclosed in U.S. Pat. No. 3,649,556, which had an adjusted pH of 3.0. The sludge level in the treated bottles of beer was measured after 5 days. They were then filtered through 1.2µ MILLIPORE filters, rebottled and placed in a refrigerator at 30° − 32°F. The chill haze was then measured on the bottles after 24 hours and 96 hours. The data obtained are given in Table 5. Another polysilicic acid hydrosol was prepared as disclosed in U.S. Pat. No. 3,649,556. The sol, which contained 5% polysilicic acid, had an adjusted pH of 2.5 and was aged at 45°C. Periodically a sample of this hydrosol was removed and used to treat duplicate bottles of beer at a concentration of 250 p.p.m. polysilicic acid in the manner described above. Duplicate bottles of this beer were also treated with 250 p.p.m. of the hydrogel of the polysilicic acid which had been aged for 4 hours at 45°C at an adjusted pH of 3.0. This data are also given in Table 5.

Table 4

| Chillproofing Additive | 48 Hr. Chill at 30°F | | 6 Hr. Agitation + 24 Hr. Chill at 30°F | | 48 Hr. Incubation + 24 Hr. Chill at 30°F | |
|---|---|---|---|---|---|---|
| | Initial | 45 Day | Initial | 45 Day | Initial | 45 Day |
| Polysilicic Acid | 32 | 92 | 45 | 180 | 40 | 185 |
| TANSUL-7 | 50 | 170 | 92 | 240 | 140 | 248 |

Table 5

| Polysilicic Acid Hydrosol Age of PSA Hours at 45°C | pH | ppm $SiO_2$ Added to Beer | Sludge Level 1/32" | Formazin Turbidity Units Chill Haze | |
|---|---|---|---|---|---|
| | | | | 24 Hr. | 96 Hr. |
| 2 | 3.0 | 0 | 1 | 86 | 78 |
| 2 | 3.0 | 10 | 1 | 339 | 250 |
| 2 | 3.0 | 25 | 1 | 297 | 295 |
| 2 | 3.0 | 35 | 1 | 124 | 128 |
| 2 | 3.0 | 50 | 1 | 119 | 105 |
| 2 | 3.0 | 75 | 1 | 82 | 82 |
| 2 | 3.0 | 100 | 2 | 85 | 74 |
| 2 | 3.0 | 125 | 3.5 | 44 | 43 |
| 2 | 3.0 | 150 | 6 | 55 | 45 |
| 2 | 3.0 | 200 | 9.5 | 40 | 39 |
| 2 | 3.0 | 250 | 13 | 62 | 57 |
| 2 | 3.0 | 300 | 15.5 | 38 | 42 |
| 2 | 3.0 | 350 | 15.5 | 47 | 45 |
| 2 | 3.0 | 400 | 19.5 | 36 | 39 |
| 2 | 3.0 | 450 | 22.5 | 45 | 47 |
| 2 | 3.0 | 500 | 23 | 44 | 41 |
| 0 | 2.5 | 250 | 1 | 158 | 160 |
| 1.5 | 2.5 | 250 | 8.5 | 48 | 43 |
| 2.5 | 2.5 | 250 | 9 | 57 | 59 |
| 3.5 | 2.5 | 250 | 14 | 41 | 43 |
| 4.5 | 2.5 | 250 | 10.5 | 50 | 46 |
| 5.5 | 2.5 | 250 | 9 | 47 | 43 |
| 6.5 | 2.5 | 250 | 11 | 32 | 36 |
| 7.5[1] | 2.5 | 250 | 10.5 | 65 | 55 |
| 8.5[2] | 2.5 | 250 | 10.5 | 71 | 67 |
| (Hydrogel) | | 250 | 4.5 | 160 | 154 |

[1] 20 RPM Brookfield RVT viscosity = 18 cp.
[2] 20 RPM Brookfield RVT viscosity = 150 cp.

The data indicate that the polysilicic acid removed more chill haze precursor substances from the beer than did the hectorite clay.

EXAMPLE 5

The beer employed in this example was obtained from a commercial brewery from ruh storage, trans- The data indicate that the untreated beer possessed exceptional chill haze stability. Accordingly this beer required a 75 p.p.m. polysilicic acid treatment in order to obtain any enhancement in the chill haze stability and about 125 p.p.m. for a significant improvement. The data also indicate that the polysilicic acid hydrosol aged at a pH of 2.5 and at 45°C efficiently enhanced the chill haze stability of this beer after aging for approximately 15% of its gelation time, which was about 8.25 hours.

It is to be understood that for the purposes of this invention the term "beer" represents beer, ale, stout, malt liquors and other similarly prepared cereal beverages and the term "gelation time" represents the aging time for a hydrosol to obtain a viscosity of 100 centipoises measured at 25°C.

I claim:

1. A process of increasing the chill haze stability of fermented alcoholic beverages, which comprises the following steps in the order indicated:
    a. adding to the beverage before final filtration from 50 to 500 parts per million parts of the beverage, by weight, of polysilicic acid in the form of a polysilicic acid hydrosol, wherein said polysilicic acid hydrosol is obtained by forming a silicic acid hydrosol and aging said silicic acid hydrosol for a period of time which is equal to at least 15% and less than 100% of the time for said hydrosol to obtain a viscosity of 100 centipoises measured at 25°C, and wherein said silicic acid hydrosol is formed by placing an aqueous solution of sodium silicate into intimate contact with a cation exchange resin in its hydrogen form whereby sodium ions in said silicate solution are removed by said resin and replaced with hydrogen ions from said resin;
    b. aging the polysilicic acid treated beverage for a period of time sufficient to coagulate chill haze precursor substances in said beverage; and
    c. separating said polysilicic acid from said beverage.

2. The process of claim 1 wherein said beverage is beer.

3. The process of claim 2 wherein said polysilicic acid is added after fermentation.

4. The process of claim 3 wherein said polysilicic acid is added as said beverage is being transferred from the fermentor to primary storage.

5. The process of claim 2 wherein said polysilicic acid hydrosol contains from 3 to 7 weight percent polysilicic acid, calculated as silica, and has a pH within the range from 2 to 4.

6. The process of claim 5 wherein said polysilicic acid is added after fermentation.

7. The process of claim 6 wherein said polysilicic acid is added as said beverage is being transferred from the fermentor to primary storage.

8. A process of increasing the chill haze stability of fermented alcoholic beverages, which comprises the following steps in the order indicated:
    a. adding to the beverage before final filtration from 50 to 250 parts per million parts of the beverage, by weight, of polysilicic acid in the form of a polysilicic acid hydrosol, wherein said polysilicic acid hydrosol is obtained by forming a silicic acid hydrosol and aging said silicic acid hydrosol for a period of time which is equal to at least 15% and less than 100% of the time for said hydrosol to obtain a viscosity of 100 centipoises measured at 25°C, and wherein said silicic acid hydrosol is formed by placing an aqueous solution of sodium silicate into intimate contact with a cation exchange resin in its hydrogen form whereby sodium ions in said silicate solution are removed by said resin and replaced with hydrogen ions from said resin;
    b. aging the polysilicic acid treated beverage for a period of time sufficient to coagulate chill haze precursor substances in said beverage; and
    c. separating said polysilicic acid from said beverage.

9. The process of claim 8 wherein said beverage is beer.

10. The process of claim 9 wherein said polysilicic acid is added after fermentation.

11. The process of claim 10 wherein said polysilicic acid is added as said beverage is being transferred from the fermentor to primary storage.

12. The process of claim 8 wherein said polysilicic acid hydrosol contains from 3 to 7 weight percent polysilicic acid, calculated as silica, and has a pH within the range from 2 to 4.

13. The process of claim 12 wherein said beverage is beer.

14. The process of claim 13 wherein said polysilicic acid is added after fermentation.

15. The process of claim 14 wherein said polysilicic acid is added as said beverage is being transferred from the fermentor to primary storage.

* * * * *